Jan. 16, 1968          L. J. ESTES          3,363,492
MACHINE TOOL RADIUS ATTACHMENT
Filed Nov. 16, 1965          2 Sheets-Sheet 2
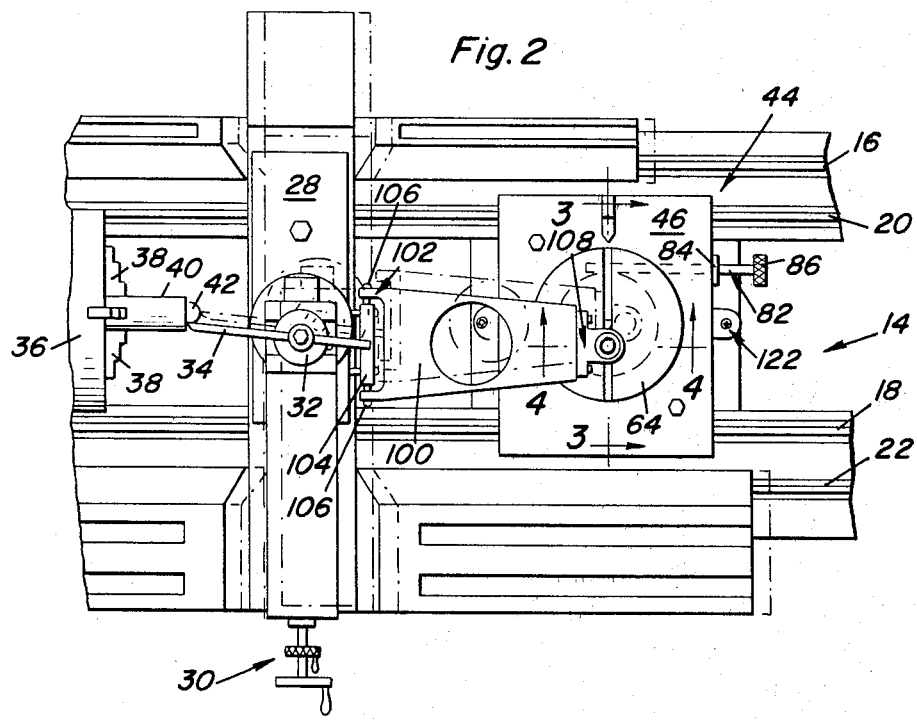
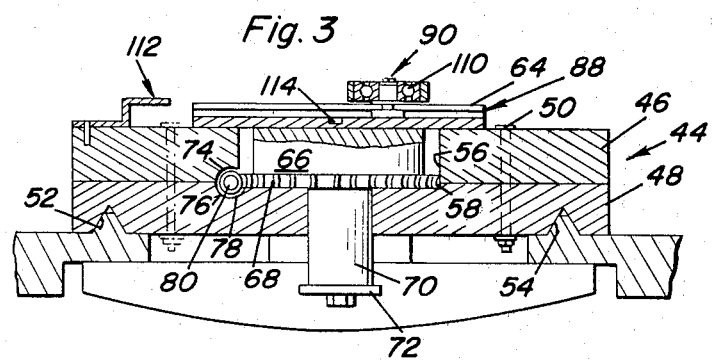
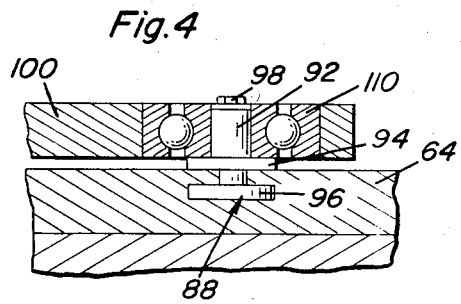
Levert J. Estes
INVENTOR.
BY *Clarence A. O'Brien*
*and Harvey B. Jackson*
Attorneys

United States Patent Office 3,363,492
Patented Jan. 16, 1968

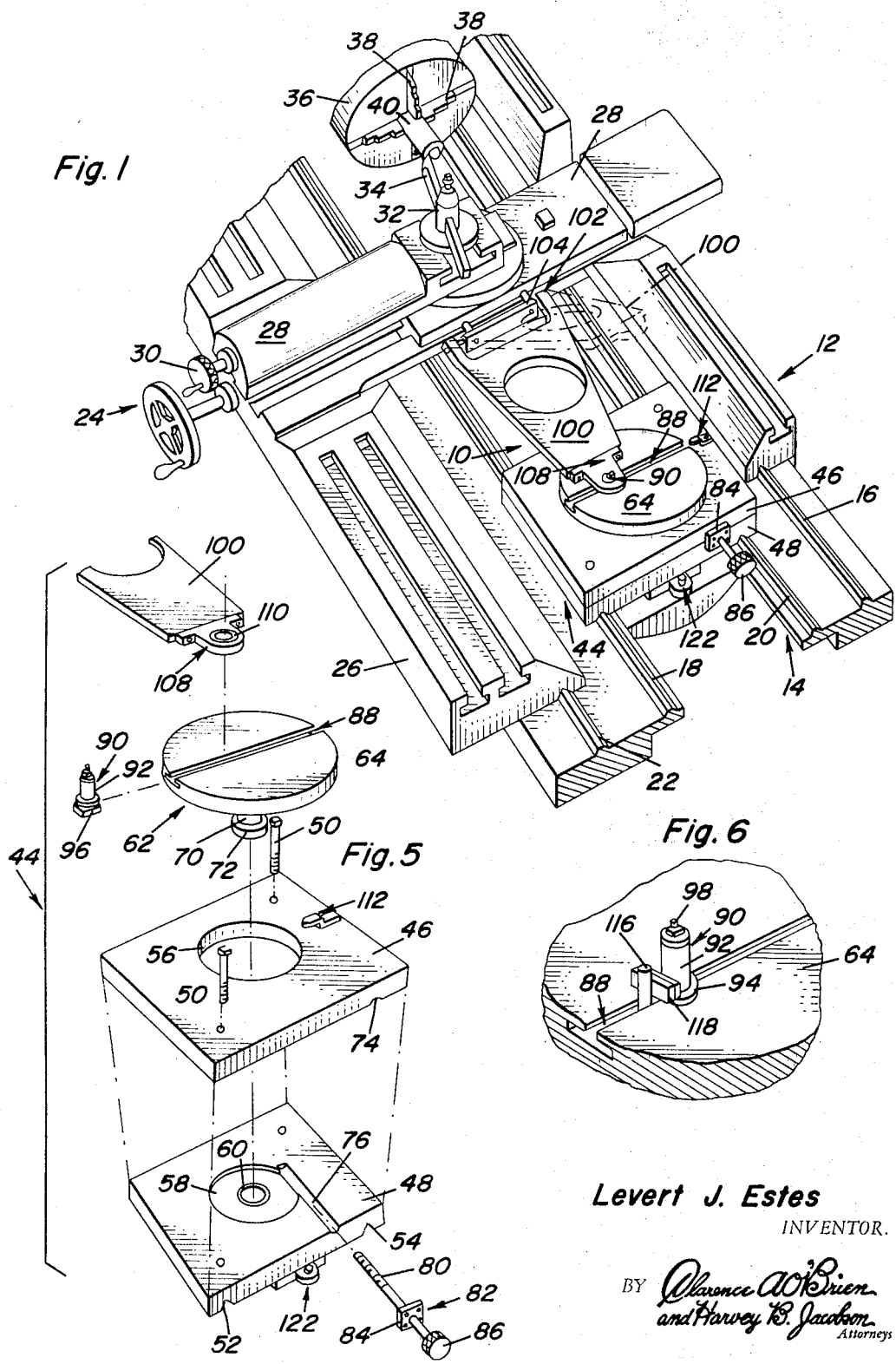

3,363,492
MACHINE TOOL RADIUS ATTACHMENT
Levert J. Estes, Parker, Ind.
(219 SW. 8th St., Dania, Fla. 33004)
Filed Nov. 16, 1965, Ser. No. 508,097
5 Claims. (Cl. 82—11)

ABSTRACT OF THE DISCLOSURE

A radius turning attachment for machine tools with cutting tool mounted upon a cross-feed member. The attachment includes a turntable mounted upon the machine tool bed. The turntable is selectively rotated by driving a worm gear arrangement situated at the base of the turntable. A track is formed to extend across the turntable surface and a slidable stud is positioned and secured off center in the turntable track. An extension arm is hinged to the cross-feed member and pivots about an axis transverse to the cross-feed member. The free end of the arm contains a circular bearing which slides over the aforementioned stud when the arm is pivoted downwardly toward the turntable. In operation, the turntable is rotated with a resultant translation of longitudinal and transverse motion to the engaged extension arm which in turn translates this motion to the cross-feed member upon which the cutting tool is mounted.

---

This invention relates generally to attachments for machine tools, and more specifically to a novel radius attachment for lathes used in machining convex, concave and spherical surfaces wherein the form or contour of the work is generated radially.

Briefly, this invention comprises a lathe attachment which includes a body portion adapted to be slidably mounted on the lathe guideways for adjustment therealong as well as being adapted to be clamped to the lathe bed. The body portion includes a turntable therein including means for locating a pilot post on the turntable a fixed distance off-center, and means for rotating the turntable. The attachment further includes a pilot arm pivotally mounted at one end to the lathe cross-feed and adapted to be connected to the pilot post at the other end whereby rotation of the turntable will drive the cross-feed through preset radius. Thus, the lathe tool kit, supported on the cross-feed, may be used to cut a preset radius on a workpiece merely by controlling movement of the turntable.

It is an object of the present invention to provide an attachment for cutting convex and concave arcs or radii with a machine lathe which may be easily and readily set for cutting various predetermined radii.

It is another object of the present invention to provide a radius attachment for lathes that permits radii to be easily and quickly turned while maintaining the desirable rigid mounting for the tool bit.

It is a further object of the present invention to provide a radius attachment for machine tools including a turntable rotatably mounted adjacent the tool holder with means operatively connecting the turntable and holder to move the tool in both longitudinal and lateral directions.

It is a still further object of the present invention to provide an attachment for lathes which may be readily and conveniently mounted on any standard lathe and when attached operates to turn convex or concave radii on workpieces.

It is a final object of the present invention to provide a radius attachment for machine tools which may be easily and simply constructed from readily available materials and which is substantially trouble free in operation and inexpensive to maintain as well as being extremely accurate in the radii turned therewith.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial perspective view of a lathe with the radius attachment comprising the present invention mounted in place thereon;

FIGURE 2 is a top plan view of the lathe and radius attachment illustrated in FIGURE 1;

FIGURE 3 is an enlarged vertical sectional view taken substantially on a plane of the line 3—3 of FIGURE 2;

FIGURE 4 is an enlarged vertical sectional view taken substantially on a plane of the line 4—4 of FIGURE 2;

FIGURE 5 is an exploded perspective view of the various components of the main housing portion of the radius attachment comprising the present invention; and FIGURE 6 is an enlarged partial perspective view of the turntable illustrated in FIGURES 1–5 of the present invention.

Referring now more specifically to the drawings, reference numeral 10 generally denotes the machine tool radius attachment of the present invention. The radius attachment 10 is illustrated in position on a lathe 12, the lathe 12 being a conventional machine lathe comprising the lathe bed 12 guideways 16, 18, 20 and 22, compound tool carriage 24 and longitudinally slidable carriage 26. The lathe 12 further includes the cross-feed member 28 with controls 30 therefor, with the tool holder 32 having tool 34 mounted therein on the cross-feed 28. The tool 34 is adapted to be disposed adjacent the workpiece chuck 36 in which the workpiece 40 is conventionally held by the slidable jaws 38. Thus, it will be appreciated that the workpiece 40 is rotated in the chuck 36 and the tool 34 is conventionally moved both longitudinally of the bed 14 and transversely thereof by either manual or automatic control of the slidable carriage 26 and cross-feed 28. Thus, a round 42 may be formed on the workpiece 40.

The radius attachment 10 includes a main housing portion generally denoted by reference numeral 44 which includes a top mounting plate 46 and a bottom mounting plate 48, both of the mounting plates being generally square and being retained together by the threaded bolts 50.

Referring to FIGURES 1 and 3 in particular, it may be seen that the bottom mounting plate 48 includes a pair of parallel grooves 52 and 54 in the bottom surface thereof whereby the housing 44 may be positioned on the guideways 18 and 20 for movement longitudinally along the lathe bed 14. The top mounting plate 46 includes a centrally located aperture 56 therein, and the bottom mounting 48 includes a circular recess 58 in the upper face thereof of equal diameter as the aperture 56. Further, the bottom mounting plate 48 includes a centrally located aperture 60 of smaller diameter than the recess 58 and aperture 56 and located centrally and coaxially of the recess 58. The apertures 56 and 60 in the recess 58 are provided in the mounting plates 46 and 48 for receiving the turntable assembly generally denoted by reference numeral 62 therein.

The turntable assembly 62 includes a turntable member 64 which is generally circular and of slightly larger diameter than the aperture 56. The turntable assembly 62 further includes a circular depending portion 66 on the bottom of the turntable 64, the portion 66 being of somewhat lesser diameter than the turntable 64 and including a peripherally encircling worm gear 68 thereon.

Referring to FIGURE 3, it will be observed that the turntable assembly further includes a journal portion 70 including a bottom flange 72 thereon which extends through the aperture 60 in bottom mounting plate 48, the flange portion 72 acting to retain the turntable assembly in the assembled mounting plates 46 and 48, the journal portion 70 allowing the turntable 64 to be rotated while eliminating any play or lateral movement thereof.

Referring now to FIGURES 1, 3 and 5, it will be observed that the top and bottom mounting plates 46 and 48 include half recess portions 74 and 76, respectively, which extend longitudinally of the mounting plate, and, when the mounting plates 46 and 48 are assembled define a chamber 78 in which is mounted the worm 80 for mating with the worm gear 68. The worm 80 comprises the forwardmost portion of a shaft generally denoted by reference numeral 82 having the mounting plate 84 and the handle 86 thereon for rotatably mounting the shaft 82 in the chamber 78. Thus, referring to FIGURES 1 and 2, it will be observed that the mounting plate 84 is screwed or otherwise fastened to the main housing 44, the shaft 82 being rotatable in the plate 84, and the worm 80 thereby being rotated upon rotation of the handle 86 whereby the worm gear 68 and hence the turntable 64 will be rotated.

The turntable 64 includes a T-slot 88 diametrically across the upper surface thereof, in which slot 88 is slidably received a pilot post generally referred to by reference numeral 90. The pilot post 90 includes an upper generally cylindrical portion 92, a circular flange postion 94 at the lower end of the cylindrical portion 92 and a generally square lowermost portion 96 which is positioned in the cross portion of the slot 88 thereby the flange portion 94 and the lowermost portion 96 will allow the pilot post to be slidable through the slot 88. The pilot post further includes a threaded member 98 which extends upwardly from the cylindrical portion 92 and has its lower end threadedly received in the lowermost square portion 96, whereby the pilot post 90 may be fixed in position in the slot 88 by turning the threaded member 98 until the lowermost portion 96 bears upwardly against the slot wall.

The radius attachment 10 further includes a pilot arm 100 which is rotatably mounted at the end 102 to a mounting bracket 104 which is attached to the cross-feed 28 in a suitable manner as for example by machine screws or the like. The mounting bracket has holes in the end thereof for receiving pins 106 in order to rotatably mount the pilot arm 100 on the mounting bracket 104. The pilot arm 100 further includes a mounting head 108, including a circular bearing 110 therein. The circular bearing 110 is substantially equal in inner diameter to the outer diameter of cylindrical portion 92 of pilot post 90 and hence, the pilot arm 100 may be swung downwardly from the position illustrated in ghost in FIGURE 1 until the head portion 108 is mounted on the pilot post 100. At this time, it will be observed that the main housing portion 44 of the radius attachment is operably connected by the pilot arm 100 to the lathe cross-feed 28.

The main housing 44 includes an indicator or pointer 112 thereon adjacent the turntable 64, the turntable 64 having, if desired, degrees marked on the upper face thereof whereby it will be possible to determine the angle of rotation of the turntable by use of the worm 80 and worm gear 68 as the turntable is turned. Further, the turntable 64 includes a recess 114 in the bottom of slot 88 at the exact center of the turntable, the recess 114 being of such size as to removably receive a guide plug 116 therein, the guide plug being used in order to provide an accurate indication of how far off-center the pilot post 90 is at any particular time. Thus, by referring to FIGURE 6 in particular, it will be observed that the guide plug 116 may be placed in the recess 114 and a pair of so-called johnny blocks 118, each being ½₂ of an inch thick may be positioned between the guide plug 116 and the pilot post 90 as the pilot post 90 is slid in the slot 88, at which time the pilot post will be tightened down in place by use of the threaded member 98. At this time, the guide plug 116 and the johnny blocks 118 may be easily removed and the center of the pilot post 90 will be accurately positioned ⅟₁₆ of an inch (or any desired amount) plus the radius of the cylindrical portion 92 off of the center of rotation of the turntable 88.

Thus, with the aforementioned description in mind, the use of the radius attachment 10 in turning the round 42 may be explained, with particular reference to FIGURES 1 and 2. First, the main housing 44 is mounted and clamped on the guideways 18 and 20 by the clamping member generally denoted by reference numeral 122 which will preferably have a threaded fastener therein in order to fix the main housing 44 on the lathe bed 14 to prevent longitudinal movement thereof when desired. The mounting bracket 104 is then bolted to the cross slide and the pilot arm 100 raised. The degree of round 42 desired is then determined, at which time the pilot post 90 is mounted off-center at this exact degree, as for example ⅟₁₆ of an inch plus the radius of the cylindrical portion 92 as described above. At this time the cross slide 28 and the carriage 26 are freed wherein they will be able to be freely moved longitudinally and transversely of the lathe bed. The pilot arm 100 is then moved downwardly until the head portion 108 is seated on the pilot post. The main housing 44 and carriage 26 and cross-feed 28 are then moved toward the workpiece 40 until the tool bit 34 is positioned at the starting point of the radius. At this time, the pilot arm 100 will be in the position illustrated in full lines in FIGURE 2, and the main housing 44 is clamped down to the lathe bed 14 by means of the locking member 122. The radius is cut by turning the handle 86 so as to move the pilot arm 100 from the position shown in full lines in FIG. 2 to the position shown in ghost in FIGURE 2 during which time the tool bit 34 will move through an exact radius of ⅟₁₆ of an inch plus the radius of the cylindrical portion 92 thereby turning a round of that size on the workpiece 40. It will be appreciated, of course, that the turning of the turntable 64 in this manner will cause the pilot arm and hence the carriage and cross-feed to move both longitudinally and transversely along the lathe bed. Thus, the tool support 32 and tool bit 34 are moved in the same radius as that preset by the setting of the pilot post off-center by means of the guide plug 116 and the johnny blocks 118. Thus, it will be observed that any desired radius may be established merely by setting the pilot post off-center, the predetermined desired amount, clamping it down at this set position, and then a radius may be cut on a workpiece by causing longitudinal and transverse movement of the tool bit with respect to the workpiece by use of the attachment 10. It will be further appreciated that the attachment 10 may be readily utilized on machine tools other than machine lathes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A radius turning attachment for machine tools including a cross-feed member movable transversely and longitudinally relative to a machine tool bed and having a tool support mounted on said cross-feed member, the attachment comprising, a base slidably engaging said machine tool bed for movement longitudinally thereof, turntable means rotatably mounted on said base and including a track extending diametrically across said turntable means, post means slidably mounted in said track, bracket means affixed to said cross-feed member, arm means, means at one end of said arm means for securing same to said bracket means, mounting means attached to the opposite end of said arm means, a circular bearing contained within said mounting means, said bearing characterized by an axis orientated perpendicularly to the plane of said arm means and wherein said circular bearing is releasably connectable to said aforementioned post means, means for rotating said turntable means whereby said tool support will be moved both longitudinally and transversely of said bed through a predetermined arc.

2. The combination of claim 1 wherein said bracket means includes hinge means for permitting rotation of said arm means relative to said cross-feed member about an axis extending transversely of said arm means.

3. A radius turning attachment for machine tools including a cross-feed member movable transversely and longitudinally relative to a machine tool bed and having a tool support mounted on the cross-feed member, the attachment comprising, a base adapted to be slidably mounted on the machine tool bed for movement longitudinally thereof, turntable means rotatably mounted on said base, arm means, means at one end of said arm means adapting said arm means for securement to said cross-feed member for movement therewith and with said arm means generally paralleling said bed, means for releasably connecting the other end of said arm means to an accurately determined off-center point on said turntable means, means for rotating said turntable means whereby said tool support will be moved both longitudinally and transversely of said bed through a predetermined arc, bracket means adapted for mounting on said cross-feed member, said one end of said arm means being rotatably connected to said bracket means for rotation relative thereto about an axis extending transversely of said arm means, said turntable means including means defining a track extending across said turntable means, means slidably mounted in said track for receiving the releasable connecting means of said arm means, means for securing said receiving means at a predetermined point along said track, said receiving means comprising an upstanding generally cylindrical member, said securing means comprising bolt means in said cylindrical member for fixing said cylindrical member in place in said track, said turntable means having a recess at the center axis thereof, and plug means adapted to be removably received in said recess for fixing said cylindrical member in said track a predetermined distance from the center axis of said turntable means.

4. The combination of claim 3 wherein said track comprises a T-slot extending diametrically across the upper face of said turntable means, said cylindrical member having base means thereon for slidably mounting said cylindrical member in said T-slot.

5. The combination of claim 3 wherein said means for rotating said turntable means includes a worm gear means integral therewith, said worm gear means being rotatably retained in a recess in said housing, and worm means mounted in said housing for driving engagement with said worm gear means, and means externally mounted on said housing for rotating said worm means whereby said turntable means will be rotated.

References Cited

UNITED STATES PATENTS

| | | | |
|---|---|---|---|
| 1,485,258 | 2/1924 | Dzus | 82—11 |
| 2,104,238 | 1/1938 | Nichols | 82—11 |

LEONIDAS VLACHOS, *Primary Examiner.*